(12) United States Patent
Gram

(10) Patent No.: US 7,524,538 B2
(45) Date of Patent: Apr. 28, 2009

(54) PAINTING AND HARDENING OF THE PAINT ON MOULDED PARTS IN A TOOL WITH A TURNABLE MOULD PART

(76) Inventor: Jes Tougaard Gram, Biskop Svanes Vej 5, D-3460 Birkerød (DK)

( * ) Notice: Subject to any disclaimer, the term of this patent is extended or adjusted under 35 U.S.C. 154(b) by 0 days.

(21) Appl. No.: 10/496,042

(22) PCT Filed: Nov. 15, 2002

(86) PCT No.: PCT/DK02/00769

§ 371 (c)(1),
(2), (4) Date: May 19, 2004

(87) PCT Pub. No.: WO03/049929

PCT Pub. Date: Jun. 19, 2003

(65) Prior Publication Data

US 2005/0003100 A1 Jan. 6, 2005

(30) Foreign Application Priority Data

Nov. 19, 2001 (DK) ............... 2001 01722

(51) Int. Cl.
*B05D 3/06* (2006.01)
(52) U.S. Cl. .................. 427/508; 427/512
(58) Field of Classification Search .......... 427/508
See application file for complete search history.

(56) References Cited

U.S. PATENT DOCUMENTS

| | | | |
|---|---|---|---|
| 2,410,532 A | 11/1946 | Tessier | |
| 5,254,164 A | 10/1993 | Masahumi | |
| 6,468,458 B1 | 10/2002 | Anderson | |
| 6,558,599 B1 * | 5/2003 | Bethune | ........... 264/255 |
| 2003/0038407 A1 | 2/2003 | Bethune | |

FOREIGN PATENT DOCUMENTS

| | | | |
|---|---|---|---|
| EP | 0953419 | | 11/1999 |
| EP | 1 264 675 A2 | * | 12/2002 |
| EP | 1264675 | | 12/2002 |
| JP | 63135213 | | 6/1988 |
| JP | 8080456 | | 3/1996 |

* cited by examiner

*Primary Examiner*—William Phillip Fletcher, III

(57) ABSTRACT

A procedure and a mechanism for the painting/lacquering and the subsequent hardening of the paint/lacquer layer on a molded object preferably of plastic. The processes are carried out in the same tool that performs the molding of the objects, which shall be painted/lacquered and hardened. This can be realized by the molding-tool, which can both be a one- and a multi-component tool, which is supplied with at least one turnable mold part, which through stepwise turning each of e.g. 90 degrees, leads the object through four stations, where the objects respectively are molded, painted/acquered, hardened and finally ejected from the turnable mold part.

26 Claims, 2 Drawing Sheets

Figure 1:
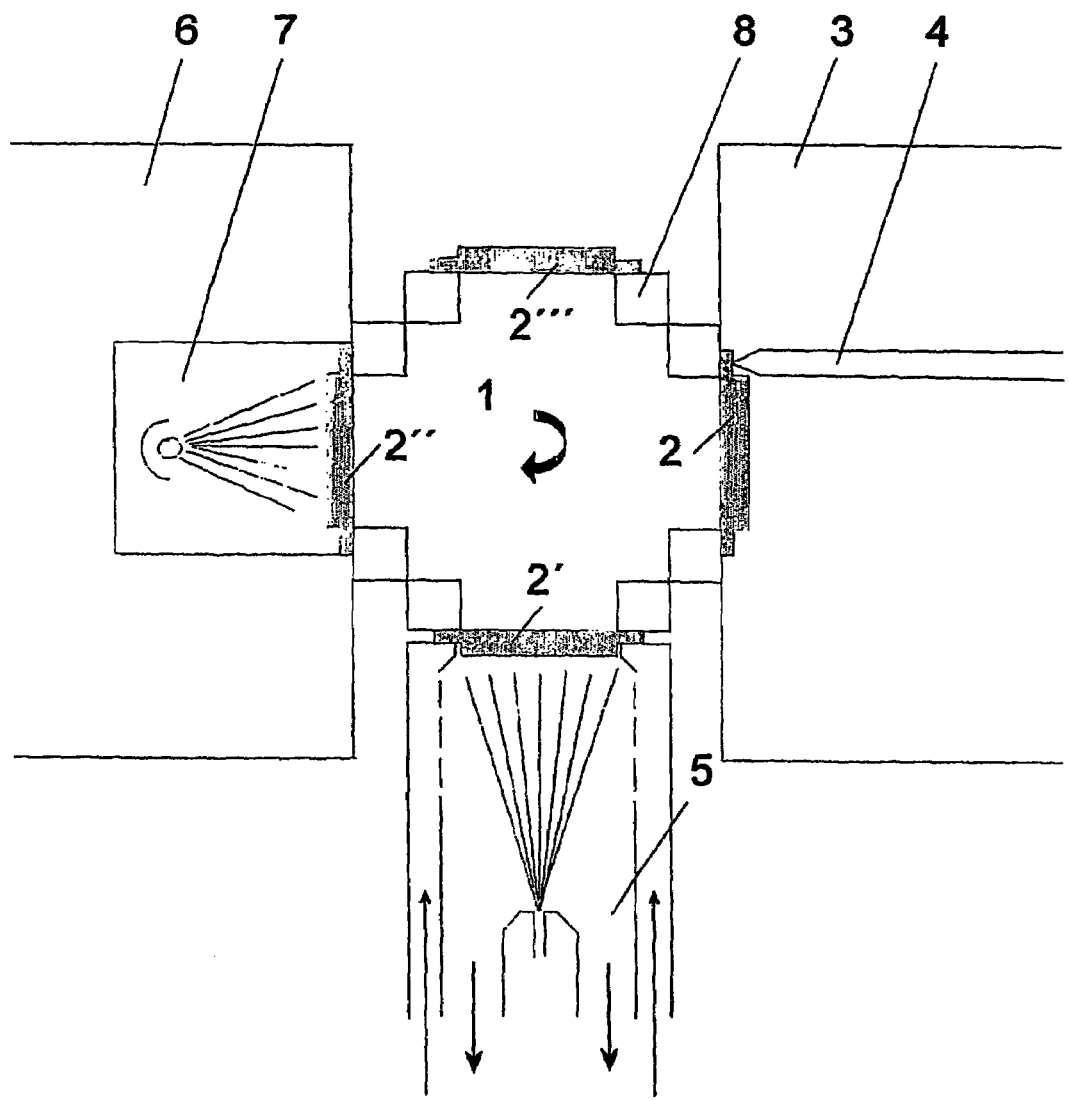

PAINTING AND HARDENING OF THE PAINT ON MOULDED PARTS IN A TOOL WITH A TURNABLE MOULD PART

FIELD OF THE INVENTION

The invention concerns a procedure and a mechanism for painting/lacquer and successive hardening of the paint/lacquer on molded objects while they still occur/remain in their with at least one turnable mold-part provided mold-tool, which can be a one-component as well as a multi-component tool.

BACKGROUND OF THE INVENTION

There are known a number of procedures for the molding of plastic objects with subsequent painting/lacquer and hardening of the paint/lacquer on the molded objects. These hitherto known methods involve however a lot of handling and transport of the objects with robots in dust free environments. With the new procedure according to the invention both painting/lacquer and hardening of the objects can be carried out while they still remains in the tool in which they are molded, which allows great savings through a faster and more secure production and an easier controllable dust free environment.

SUMMARY OF THE INVENTION

The procedure and the mechanism according to the invention are characterized by the fact, that the paint/lacquer is applied to the object in a position at least one station/stage after the molding and preferably while the mold is closed, after which the painted/lacquered object by a controlled enlightening from a UV light source or another kind of energy supply is hardened, preferably after the turnable mold part is turned at least one more station further ahead.

The additional embodiments and advantages from the procedure and the mechanism according to the invention will appear from the drawing, where

BRIEF DESCRIPTION OF THE DRAWING FIGURES

Figure 2:
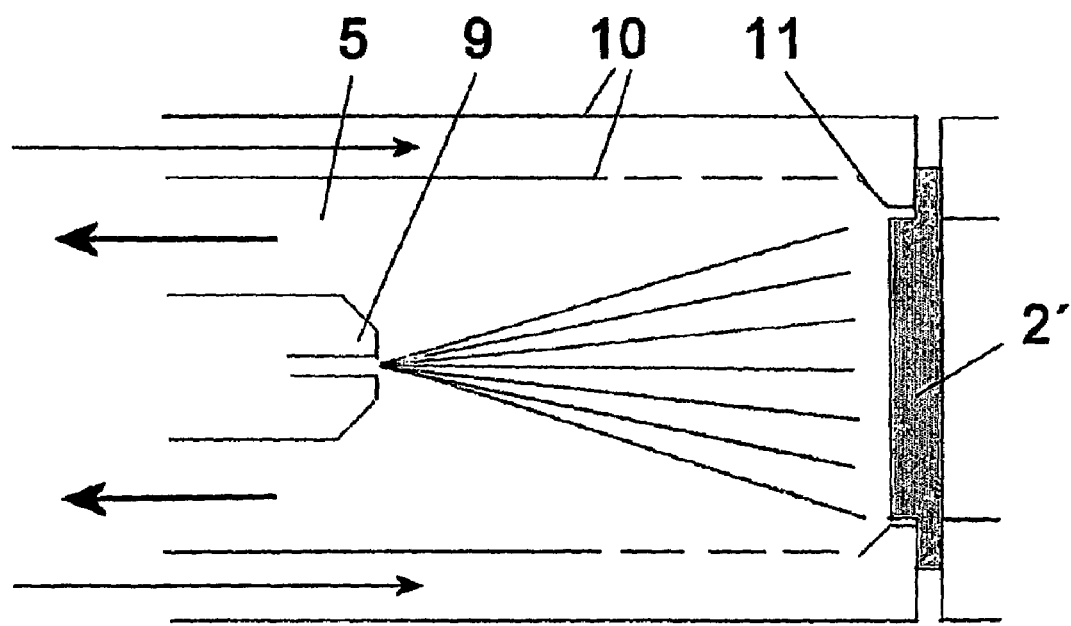

FIG. 1 shows a cross section of a tool according to the invention seen from above with all the four stages in a production cycle shown at the same time, and FIG. 2 shows a cross section of a mechanism for the applying of paint/lacquer, here a nozzle placed in a double walled telescope with belonging masking for the covering of the object.

DETAILED DESCRIPTION OF THE PREFERRED EMBODIMENTS

On FIG. 1 there is seen from above shown a cross section of a tool according to the invention in a closed position. The turnable mold part 1 is here shown as a square with cut off corners and with the objects 2, 2', 2" and 2''' shown in four various stages placed on each of the four sides of the turnable mold part 1. The object 2 has just been molded between the turnable mold part 1 and the stationary mold part 3 through the inlet 4. The object 2' is shown a station further ahead after the opening of the mold, turning of the turnable mold part 1 90 degrees clockwise and closing of the mold. In this on the figure shown as the lowest position of the turnable mold part 1 the molded object 2', still firmly placed on the turnable mold part 1, are being applied a preferably thin layer of paint/lacquer, in this case from a special applying device 5. As for the object 2" it is turned additional 90 degrees forward after the opening of the mold and subsequent re-closing, and it is now placed between the movable mold part 6, which is shown with a built in UV light source 7, and the turnable mold part 1, in which it still remains. It is in this station the applied layer of paint/lacquer is hardened. Finally the object 2''' shown in the uppermost position of the figure after additional a turning of the turnable mold part 90 degrees clockwise just before the object as complete/finish molded, painted/lacquered and hardened is ejected from the turnable mold part 1 by means of the stripper plate 8. It is seen, that the objects 2, 2', 2" and 2''' describes a complete cycle for the production of a molded, painted/lacquered and hardened object. After one more opening of the mold and an additional tuning of 90 degrees as well as closing of the mold, the tool according to the invention is back in its initial position and ready for a new cycle, starting with the injection of new material through the inlet 4 in the stationary mold part 3.

FIG. 2 shows the special mechanism 5 for the applying of the paint/lacquer layer on the object. It consists of a nozzle 9, which is situated in a double wailed telescope mechanism 10, wherein there can be produced an under-pressure, an over-pressure, turbulence or other forms of air streams, which can serve to apply a paint/lacquer-suitable and controlled atmosphere around the abject 2', plus prohibit surplus paint/lacquer in being spread out in the tool, when this is opened and is turned. Furthermore there is on the figure shown a masking 11, the purpose of which is to cover the areas of the object, which shall not be, applied paint/lacquer. Mechanism 5 may be provided as a mechanism for the carrying out of electrostatic painting/lacquering, so that the necessary quantity of the paint/lacquer is minimized, just as the formation of dust and other pollution is brought down to a minimum.

On the drawing there could also have been shown other embodiments of the mechanism according to the invention, e.g. where the turnable mold part was designed mainly as a regular hexagon or a regular octagon. There would thus be more stations during the turning, where e.g. an additional cooling could happen or a hardening of the paint/lacquer. This could also be effectuated with a turning table or an index plate system with more stations instead of the shown system with a turnable middle section. There could as well have been shown a tool with two or more turnable mold parts, just as there could have been shown tools according to the invention with two or more inlets, so there also could have been demonstrated multi-component molding. But the on the drawing shown should be sufficient to explain the fundamental principles in the procedure and the mechanism according to the invention.

The molded objects, which in the previous mentioned above are mainly plastic objects. But the procedure and the mechanism according to the invention can also be applied on objects molded in metals as aluminum and magnesium, in different alloys or in other moldable materials.

The invention claimed is:

1. A rotatable tool for applying a coating to an object, the tool comprising:
    at least one turnable mold part on which the object is removably affixed;
    an applicator for applying a coating comprising material selected from one of paint or lacquer; and
    a hardening device comprising an energy supply;
    wherein the at least one turnable mold part is rotatable to present the affixed object at a first position at which the coating is applied to the object by the coating applicator;

wherein the at least one turnable mold part is rotatable to present the affixed object at a second position at which the coating applied to the object is hardened by the hardening device; and wherein the applicator is one of a spray applicator or an electrostatic applicator.

2. The rotatable tool of claim 1, further comprising a first position encasing mechanism that at least partially surrounds the object at the first position.

3. The rotatable tool of claim 2, wherein fluid openings are provided in said first position encasing mechanism through which a fluid may be introduced into a space within the first position encasing mechanism.

4. The rotatable tool of claim 3, wherein said fluid is air.

5. The rotatable tool of claim 3, wherein said first position encasing mechanism completely encapsulates the space within the first position encasing mechanism so that the space may be maintained at a desired pressure.

6. The rotatable tool of claim 1, wherein said energy supply comprises a UV light source.

7. The rotatable tool of claim 1, further comprising a second position encasing mechanism that at least partially surrounds the object at the second position.

8. The rotatable tool of claim 7, wherein fluid openings are provided in said second position encasing mechanism through which a fluid may be introduced into a space within the second position encasing mechanism.

9. The rotatable tool of claim 8, wherein the second position encasing mechanism completely encapsulates the space within the second position encasing mechanism so that the space may be maintained at a desired pressure.

10. The rotatable tool of claim 1, wherein the object is formed on the at least one turnable mold part in a molding step before the coating is applied.

11. The rotatable tool of claim 1, further comprising an ejector for ejecting the object from the at least one turnable mold part at a third position.

12. The rotatable tool of claim 11, wherein the ejector comprises a stripper plate disposed on the at least one turnable mold part.

13. The rotatable tool of claim 1, wherein the at least one turnable mold part has multiple faces so that the application of the coating and the hardening of the coating may be simultaneously performed on multiple objects affixed to the multiple faces of the at least one turnable mold part.

14. A method of coating an object comprising the steps of:
providing a rotatable tool having at least one turnable mold part, a coating applicator, and a hardening device comprising an energy supply;
removably affixing the object to the at least one turnable mold part;
rotating the at least one turnable mold part to dispose the object at a first position;
applying a coating comprising material selected from paint and lacquer on the object by either spraying or electrostatically applying the coating onto the object;
rotating the at least one turnable mold part to dispose the object at a second position; and
hardening the coating on the object.

15. The method of claim 14, further comprising the step of at least partially surrounding the object with a first position encasing mechanism.

16. The method of claim 15, further comprising the step of introducing a fluid from a space within the first position encasing mechanism through fluid openings.

17. The method of claim 16, further comprising the step of maintaining a desired pressure within the space within the first position encasing mechanism while the coating is applied to the object.

18. The method of claim 16, further comprising the step of regulating the temperature of the fluid introduced into the space within the first position encasing mechanism.

19. The method of claim 14, wherein the hardening step further comprises subjecting the coating on the object to UV light.

20. The method of claim 14, further comprising the step of at least partially surrounding the object with a second position encasing mechanism.

21. The method of claim 20, further comprising the step of introducing a fluid from a space within the second position encasing mechanism through fluid openings.

22. The method of claim 21, further comprising the step of maintaining a desired pressure within the space within the second position encasing mechanism while the coating is hardened on the object.

23. The method of claim 21, further comprising the step of regulating the temperature of the fluid introduced into the space within the second position encasing mechanism.

24. The method of claim 14, further comprising an initial step of molding the object onto the at least one turnable mold part.

25. The method of claim 14, further comprising the step of ejecting the object from the at least one turnable mold part after the hardening step.

26. The method of claim 14, wherein the at least one turnable mold part is provided with multiple faces, and the application of the coating step and the hardening of the coating step is simultaneously performed on multiple objects affixed to the multiple faces of the at least one turnable mold part.

* * * * *